(12) United States Patent
Aschauer (10) Patent No.: US 10,797,730 B2
(45) Date of Patent: Oct. 6, 2020

(54) APPARATUS AND METHOD FOR CREATING AN ASYMMETRIC CHECKSUM

(71) Applicant: Siemens Aktiengesellschaft, Munich (DE)

(72) Inventor: Hans Aschauer, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 172 days.

(21) Appl. No.: 15/752,321

(22) PCT Filed: Jul. 29, 2016

(86) PCT No.: PCT/EP2016/068151
§ 371 (c)(1),
(2) Date: Feb. 13, 2018

(87) PCT Pub. No.: WO2017/045824
PCT Pub. Date: Mar. 23, 2017

(65) Prior Publication Data
US 2018/0241417 A1     Aug. 23, 2018

(30) Foreign Application Priority Data
Sep. 16, 2015   (DE) ........................ 10 2015 217 724

(51) Int. Cl.
  *H03M 13/00*  (2006.01)
  *H04L 9/32*   (2006.01)
  (Continued)

(52) U.S. Cl.
  CPC ......... *H03M 13/616* (2013.01); *H03M 13/09* (2013.01); *H03M 13/096* (2013.01); *H04L 9/3247* (2013.01); *H04L 63/123* (2013.01)

(58) Field of Classification Search
  CPC .. H03M 13/616; H03M 13/09; H03M 13/096; H04L 9/3247; H04L 9/3066; H04L 9/3073; H04L 9/00; H04L 63/123
  See application file for complete search history.

(56) References Cited

U.S. PATENT DOCUMENTS

| | | |
|---|---|---|
| 2002/0138732 A1 | 9/2002 | Irvin |
| 2010/0027625 A1* | 2/2010 | Wik ...................... G10L 19/002 375/240.12 |

(Continued)

OTHER PUBLICATIONS

Witten, Helmut et al.:"11RSA & Co. in der Schule—Moderne Kryptologie, alte Mathematik, raffinierte Protokolle. Neue Folge—Teil 2: RSA für grosse Zahlen"; in: Praxis & Methodik, Log in; vol. 26; No. 143; pp. 50-58; XP009192000.

(Continued)

*Primary Examiner* — Christine T. Tu
(74) *Attorney, Agent, or Firm* — Schmeiser, Olsen & Watts LLP (57) ABSTRACT

A device for the computer-aided creation of an asymmetric checksum by a first communication partner, in which a processor calculates a mapped checksum by means of bijective mapping from a first checksum, wherein the first checksum from the set of all possible checksums is assigned by means of a first function to respectively one message from a set of all possible messages, the first checksum is prepared in particular by mapping the set of all possible checksums onto a first set by a second function. Information is distributed which defines an inverse function relative to the bijective mapping to at least one second communication partner, wherein the first checksum is calculated from the mapped checksum by means of the inverse function. The mapped checksum and the message are transmitted to the at least one second communication partner.

18 Claims, 3 Drawing Sheets

(51) Int. Cl.
*H03M 13/09* (2006.01)
*H04L 29/06* (2006.01)

(56) References Cited

U.S. PATENT DOCUMENTS

2013/0159817 A1\* 6/2013 Carlach ................ H04L 1/0057
714/776
2016/0204795 A1\* 7/2016 Huang ................ H03M 7/6005
341/87

OTHER PUBLICATIONS

Anonymous:""Hill-Chiffre"—Versionsunterschied"; in: Wikipedia; XP055308196; Gefunden im Internet: URL:https://de.wikipedia.org/w/index.php?title=Hill-Chiffre&diff=142872892&oldid=I42872455.
Witten, Helmut et al.:"Kann man RSA vertrauen? Asymmetrische Kryptografie für die Sekundarstufel"; in: Praxis & Methodik, Log in Heft, Informatische Bildung und Computer in der Schule; pp. 79-91; XP055307837; Gefunden im Internet: URL:http://bscw.schule.de/pub/bscw.cgi/d1024037/RSA Sekl.pdf.
Anonymous: ""RSA—Kryptosystem"—Versionsunterschied"; in: Wikipedia; pp. 1-14; XP055307752; Gefunden im Internet: URL:https://de.wikipedia.org/w/index.php?title=RSA-KRyptosystem&diff=146057000&oldid=145881181.
PCT International Search Report for PCT International Application No. PCT/EP2016/068151, dated Oct. 19, 2016.

\* cited by examiner

APPARATUS AND METHOD FOR CREATING AN ASYMMETRIC CHECKSUM

CROSS-REFERENCE TO RELATED APPLICATIONS

This application claims priority to PCT Application No. PCT/EP2016/068151, having a filing date of Jul. 29, 2016, based off of German application No. DE 102015217724.6 having a filing date of Sep. 16, 2015, the entire contents of both of which are hereby incorporated by reference.

FIELD OF TECHNOLOGY

The following relates to a method and devices for forming an asymmetric checksum and for checking the asymmetric checksum.

BACKGROUND

When data are transmitted, errors occasionally occur that alter the transmitted data. To prevent this, what is known as a checksum for the data is frequently computed and transmitted or stored together with said data. When the data are received or read, the checksum is again computed and compared with the transmitted checksum. If the two checksums are the same, then it is assumed that there is a high likelihood that an error has not occurred. The level of this likelihood can be computed or estimated, in principle, from the properties of the computation method (checksum function) and the error model adopted.

For the most part, specific applications have the requirement that the checksum function can be computed efficiently. Examples of such checksum functions are CRC16 (cyclic redundancy check 16) or CRC32 (cyclic redundancy check 32). In the case of safety-relevant devices, customers or regulations often call for particular safety integrity levels, as stipulated in the safety standard EN 61508, for example. This requires a risk assessment, which also involves the checksum functions used being checked. The aim in this case is to provide the evidence that an error in the program execution does not result in a checksum being incorrectly identified as correct despite it actually being erroneous, for example.

The fundamental problem in this case is that, according to the prior art, the algorithm for checking the checksum also includes the algorithm for computing the checksum. A receiver of a message needs to compute the checksum itself, in principle, the receiver subsequently also being referred to as a verifier or verifier device. In the event of a malfunction in the verifier device, it is fundamentally assumed that the verifier device inadvertently computes the checksum for the corrupted data again itself and compares the result of the two separate computations, which annuls the function of the checksum, meaning that it is no longer possible for errors to be detected. Should the verifier forward the data with the corrupted checksum, other verifiers would also no longer be able to detect errors.

Helmut Witten et al.: "Kann man RSA vertrauen? Asymmetrische Kryptografie für die Sekundarstufe I" [Can RSA be trusted? Asymmetric cryptography for secondary level I], LOG IN magazine, computer science education for schools, Dec. 1, 2012, pages 79-91, and retrievable from http://bscw.schule.de/pub/bscw.cgi/d1024037/RSA_Sekl.pdf, and anonymous: ""RSA-Kryptosystem"—Versionsunterschied—Wikipedia" ["RSA cryptosystem"—version difference—Wikipedia], Sep. 15, 2015, pages 1-4, and retrievable from https://de.wikipedia.org/w/index.php?title=RSA-Kryptosystem&diff=1463057000&oldid=145881181, disclose standard methods for asymmetric cryptography using a one-way function.

SUMMARY

An aspect relates to providing a method and devices for computing and checking an asymmetric checksum.

According to a first aspect, embodiments of the invention relates to a method for a first communication partner to create an asymmetric checksum on a computer-aided basis, in which a processor is programmed to carry out the method steps. The method comprises a method step for computing a mapped checksum by means of a bijective mapping from a first checksum, wherein the first checksum is assigned from the set of all possible checksums to a respective message from a set of all possible messages by means of a first function, wherein the first checksum is conditioned in particular by virtue of a second function mapping the set of all possible checksums onto a first set. The method comprises a further method step for distributing a piece of information that defines an inverse function for the bijective mapping to at least one second communication partner, wherein the inverse function is used to compute the first checksum from the mapped checksum. The method comprises a further method step for transmitting the mapped checksum and the message to the at least one second communication partner.

In particular, the conditioning of the first checksum is performed by virtue of the second function mapping the set of all possible checksums onto the first set before the bijective mapping is computed.

The method ensures that the second communication partner, likewise referred to as a receiver, verifier or verifier device, does not incorrectly compute the correct checksum even though the message to be checked is erroneous. By way of example, an error in the program execution can result in a message or checksum being incorrectly detected as correct despite it actually being erroneous.

The method moreover ensures that the second communication partner is not in possession of the information to inadvertently compute the mapped checksum. To verify the checksum, the information that defines the inverse function is sufficient. The asymmetric design of checksum generation and checksum verification means that the verification algorithm therefore no longer includes the algorithm for checksum generation.

The method preferably computes an asymmetric checksum by using noncryptographic asymmetric methods so that the asymmetric checksum can be computed as quickly as possible. So that the method is as efficient as possible, key lengths of the methods employed can be chosen to be very short, for example. These can therefore be chosen to be much shorter than would be necessary for safety-critical applications.

The conditioning of the set of all possible checksums by the second function onto the first set can be used to first of all put the checksums into a format that only then allows a bijective mapping or that can be used to compute a bijective mapping particularly easily. In a specific implementation, the second function conditions the first checksum before the bijective mapping is computed, for example.

In a first embodiment of the method, in addition to the message and the mapped checksum the first checksum is sent to the second communication partner.

The sending of the first checksum to the second communication partner improves the check on the correctness of the message still further. This is achieved by virtue of the first checksum additionally being compared with the checksum that is computed by the second communication partner.

In further embodiments of the method, the computing of the mapped checksum forms a secret that is known to the first communication partner.

As a result of only the first communication partner knowing how the mapped checksum is computed, it is extremely unlikely that a programming error will incorrectly result in a correct checksum being computed for an erroneous message.

In further embodiments of the method, the conditioning of the first checksum using the second function is performed in a first preprocessing step before the computing of the mapped checksum, the bijective mapping being in particular a mapping of the first set onto itself.

According to a further aspect, embodiments of the invention relate to a method for a second communication partner to check an asymmetric checksum on a computer-aided basis, in which a processor is programmed to carry out the method steps. The method comprises a method step for receiving a piece of information that defines an inverse function for a bijective mapping from a first communication partner. The method comprises a further method step for receiving a mapped checksum and a message from a first communication partner. The method comprises a further method step for computing a second checksum by means of the inverse function using the mapped checksum, wherein the second checksum is assigned from the set of all possible checksums to a respective message from a set of all possible messages by means of a first function, wherein the set of all possible checksums is mapped onto a first set using a second function, the bijective mapping being a mapping of the first set onto itself. The method comprises a further method step for computing a third checksum for the message. The method comprises a further method step for establishing a correctness of the message if the second checksum has a sufficient match with the third checksum.

In a first embodiment of the method, in addition to the message and the mapped checksum a first checksum is received from the first communication partner, wherein the first checksum is preferably additionally compared with the second checksum and/or the third checksum, and wherein the correctness of the message is established if the first checksum has a sufficient match with the second checksum and/or the third checksum.

The receiving of the first checksum from the first communication partner improves the check on the correctness of the message still further. This is achieved by virtue of the first checksum additionally being compared with the checksum that is computed by the second communication partner.

In further embodiments of the method, the conditioning of the third checksum using the second function is performed in a second preprocessing step before the establishing of the correctness in the message, the bijective mapping being in particular a mapping of the first set onto itself.

In general, the conditioning of a checksum by the second function allows, by way of example, the checksum to be put into a form that either only then allows a bijective mapping, allows the bijective mapping to be computed more easily or that means that the bijective mapping fulfils particular predefined properties, for example mathematical conditions. The information about the second function can be transmitted to the second communication partner separately or may be included in the information about the inverse function.

In further embodiments of the method, the second function maps a 64-bit checksum onto a 32-bit checksum or the second function is the identity.

The mapping can be computed very efficiently by a processor on different computer architectures. In this respect, the use of the latter is particularly well suited as a second function, since said second function can quickly be computed by simply removing the surplus bits.

The identity can be used for instances of application in which the set of all possible checksums or the first checksum is not supposed to be altered by the second function, for example.

In further embodiments of the method, the first set or the set of all possible checksums is a monoid, wherein the monoid comprises the identity element as neutral element and an operation of a logic combination is defined for the monoid, wherein the first communication partner selects an invertible element of the monoid, wherein the first communication partner computes an inverted element for the invertible element, wherein the mapped checksum is formed by means of the bijective mapping in the form of the logic combination of the first checksum with the invertible element, wherein the information comprises the inverted element, and wherein the logic combination of in particular the invertible element and the mapped checksum results in the identity element.

An implementation of the method on the basis of a monoid affords the advantage that the method can be implemented very efficiently. By way of example, it can be employed on systems with limited computation capacity, such as chip cards, for example, so that the chip card can generate the asymmetric checksum.

In further embodiments of the method, the second checksum is computed by means of the inverse function in the form of the logic combination of the inverted element with the mapped checksum.

An implementation of the method on the basis of a monoid affords the advantage that the method can be implemented very efficiently. By way of example, it can be employed on systems with limited computation capacity, such as chip cards, for example, so that the chip card can check the asymmetric checksum.

In further embodiments of the method, the first set or the set of all possible checksums is a vector space, wherein the first communication partner forms an invertible matrix from the vector space, wherein the first communication partner forms an inverted matrix from the invertible matrix, wherein the information comprises the inverted matrix, and wherein the mapped checksum is formed by means of the bijective mapping in the form of the matrix multiplication of the first checksum by the matrix.

An implementation of the method on the basis of matrixes and a matrix multiplication affords the advantage that the method can be computed extremely quickly on computer architectures that are optimized in respect of vector and matrix computations. These may be vector computers, for example, or alternatively graphics cards.

In further embodiments of the method, the second checksum is computed by means of the inverse function in the form of the matrix multiplication by virtue of the inverted matrix being multiplied by the mapped checksum.

An implementation of the method on the basis of matrixes and a matrix multiplication affords the advantage that the method can be computed extremely quickly on computer architectures that are optimized in respect of vector and matrix computations. These may be vector computers, for example, or alternatively graphics cards.

In further embodiments of the method, the first communication partner forms a first table in which a mapped checksum is assigned to each of all possible checksums, wherein the first communication partner forms a second table in which a checksum is assigned to a respective mapped checksum, wherein the first table is the bijective mapping and the second table is the inverse function of the bijective mapping, and wherein the information about an inverse function comprises the second table.

An implementation of the method on the basis of tables allows the method to be carried out on extremely computationally weak systems, such as RFID chips, for example. The tables can each be implemented as lookup tables (LUT) or conversion tables. The use of tables has, in particular, the advantage that computation of a mapped checksum is not necessary at runtime.

In further embodiments of the method, the second checksum is computed by means of the inverse function in the form of the second table.

An implementation of the method on the basis of tables allows the method to be carried out on extremely computationally weak systems, such as RFID chips, for example. The tables can each be implemented as lookup tables (LUT) or conversion tables. The use of tables has, in particular, the advantage that computation of the second checksum is not necessary at runtime.

In further embodiments of the method, a mapped checksum is implemented as a numeral or as an alphanumeric value.

The representation of the mapped checksum as a numeral or as an alphanumeric value allows the tables to be generated in a particularly simple manner.

According to a further aspect, embodiments of the invention relate to a first communication partner for generating an asymmetric checksum. The first communication partner has a first computation device and a transmission device. The first computation device uses a processor to compute a mapped checksum by means of a bijective mapping from a first checksum, wherein the first checksum is assigned from the set of all possible checksums to a respective message from a set of all possible messages by means of a first function, the first checksum optionally being conditioned in particular by virtue of a second function mapping the set of all possible checksums onto a first set. The transmission device distributes a piece of information that defines an inverse function for the bijective mapping to at least one second communication partner, wherein the inverse function is used to compute the first checksum from the mapped checksum and the transmission device transmits the mapped checksum and the message to the at least one second communication partner.

In a first embodiment of the first communication device, the first communication device is a virtualized first communication device.

A virtualized first communication device has the advantage that it can be employed inexpensively in a virtualized computer system and dispenses with expensive hardware.

According to a further aspect, embodiments of the invention relate to a second communication partner for checking an asymmetric checksum, which second communication partner has a reception device and a second computation device. The reception device receives a piece of information that defines an inverse function for a bijective mapping from a first communication partner, and the reception device receives a mapped checksum and a message from the first communication partner. The second computation device uses a processor to compute a second checksum by means of the inverse function using the mapped checksum. The second computation device uses the processor to compute a third checksum for the message, wherein the third checksum is assigned from the set of all possible checksums to a respective message from a set of all possible messages by means of a first function, the third checksum being conditioned in particular by virtue of a second function mapping the set of all possible checksums onto a first set. The second computation device establishes a correctness of the message if the second checksum has a sufficient match with the third checksum.

In a first embodiment of the second communication device, the second communication device is a virtualized second communication device.

A virtualized second communication device has the advantage that it can be employed inexpensively in a virtualized computer system and dispenses with expensive hardware.

Moreover, an integrated circuit, for example an FPGA or an ASIC, having the cited features according to embodiments of the invention is claimed. In addition, an integrated circuit is claimed that is equipped with configuration steps for carrying out the cited method according to embodiments of the invention or are configured with configuration steps such that the integrated circuit has the features according to embodiments of the invention of the first communication device or the second communication device.

Moreover, a computer program product (non-transitory computer readable storage medium having instructions, which when executed by a processor, perform actions) having program instructions for performing the cited method according to embodiments of the invention are claimed. In addition, a provision apparatus for storing and/or providing a data structure that comprises the computer program product is claimed. The provision apparatus is a data storage medium that stores and/or provides the computer program product, for example. Alternatively, the provision apparatus is a computer system, a server system, a network, a cloud-based computer system and/or virtual computer system that stores and/or provides the computer program product, for example. This provision is preferably effected as a download of the complete computer program product, but can also be effected as a partial download, for example, which consists of multiple parts and is, in particular, downloaded via a peer-to-peer network. Such a computer program product is read into a system using the provision apparatus in the form of the data storage medium, for example, and executes the program instructions, so that the method according to embodiments of the invention are carried out on a computer.

BRIEF DESCRIPTION

Some of the embodiments will be described in detail, with reference to the following figures, wherein like designations denote like members, wherein.

In the figures, elements having the same function are provided with the same reference symbols, unless indicated otherwise.

DETAILED DESCRIPTION

Figure 1:
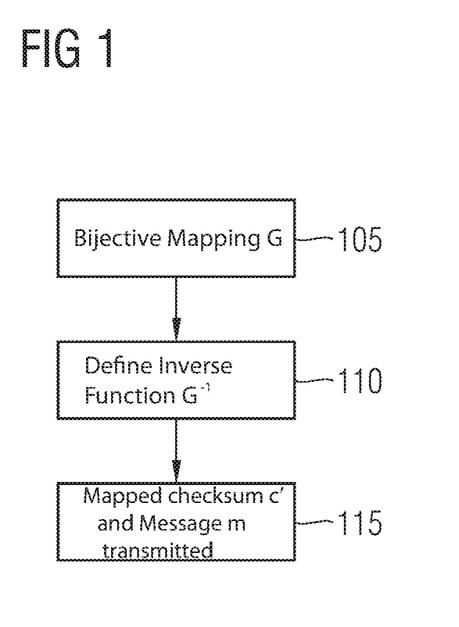
FIG. 1 shows a flowchart for an exemplary embodiment for generating an asymmetric checksum.

FIG. 1 is a flowchart for an exemplary embodiment for generating an asymmetric checksum.

In order to compute an asymmetric checksum, which is also referred to as a mapped checksum c', for a message m, a first function $F_1$, for example a checksum function, can first of all be used to assign a checksum c from the set of all checksums C to every single message from the set of all messages M:

$$F_1: M \to C \quad \text{(Formula 1)}$$

For a message m, a first checksum $c_1$ is therefore first of all computed by means of the first function.

A second function $F_2$ conditions the first checksum $c_1$ in a first preprocessing step. This preprocessing step is optional, that is to say not absolutely necessary, but has the advantage that the first checksum $c_1$ is put into a representation thereby for which a bijective mapping is first possible, for example. It is also possible for a representation to be chosen that allows the bijective mapping to be computed more easily or for which the bijective mapping fulfils particular predefined properties, for example mathematical conditions. These computations can then preferably likewise be carried out by the second communication partner so that it can check the transmitted mapped checksum c'. Details in this regard are explained in the applicable exemplary embodiment of FIG. 2.

Expressed in more general terms, the second function $F_2$ is used to map the set of all possible checksums C onto a first set C', this also resulting in the first checksum $c_1$ being mapped. Consequently, the first checksum $c_1$ is an element of the set of all possible checksums C before the first preprocessing step and, after application of the second function $F_2$, the first checksum is therefore an element of the first set C'. The first checksum $c_1$ can also be referred to as a conditioned first checksum after this first preprocessing step.

$$F_2: C \to C' \quad \text{(Formula 2)}$$

In one variant, the second function $F_2$ is a function that maps a 64-bit checksum onto a 32-bit checksum by removing bits.

In a further variant, the second function $F_2$ is a function that maps the set of all possible checksums C in unaltered form onto the first set C'. This can be useful to make the set of all possible checksums C available in unaltered form for further computations, for example.

In other words, it is also possible to always apply the second function $F_2$ to the first checksum $c_1$, for example. In application scenarios in which the first checksum $c_1$ or the set of all possible checksums C is supposed to be provided in unaltered form or in unconditioned form for further computation steps, it is possible for an identity function or an identical mapping of the set of all possible checksums C onto the first set C' to be chosen for the second function $F_2$, for example.

In order to compute the mapped checksum c' for a message m in a first method step 105 using a first communication partner, a bijective mapping G of the first set C' or of the set of all possible checksums onto itself is used. In other words, the bijective mapping G is a function that performs a permutation of the mapped checksums c', the first checksum $c_1$ being an input parameter for the bijective mapping G.

Therefore, the mapped checksum c' can easily be computed for the first checksum $c_1$.

$$c' = G(c_1) \quad \text{(Formula 3)}$$

Using an inverse function $G^{-1}$ for the bijective mapping, it is possible for the first checksum $c_1$, which may have been conditioned by the second function $F_2$, or the conditioned first checksum to be computed from the mapped checksum c' again.

$$c_1 = G^{-1}(c') \quad \text{(Formula 4)}$$

The bijective mapping G or the asymmetric checksum c' prevents the bijective mapping G from generating the same result as the inverse function $G^{-1}$ or prevents the inverse function $G^{-1}$ from generating the same result as the bijective mapping G. In particular, an involution is impossible for the bijective mapping G and the inverse function $G^{-1}$. In other words, this prevents the bijective mapping G and the inverse function $G^{-1}$ from matching. An example of such an involution would be an exclusive-or function combining the first checksum $c_1$ with a constant a.

$$G(c_1) = c_1 \, xor \, a \quad \text{(Formula 5)}$$

Depending on the computation model or computer architecture, are impossible for particular variants for computing the bijective mapping. In particular, computations of the following type are impossible:

$$G(c_1) = c_1 + a \bmod 2^{32} \quad \text{(Formula 6)}$$

where mod is the modulo operation. Such a computation of the mapped checksum is problematic because the inverse function $G^{-1}$ for formula 6

$$G^{-1}(c') = c' - a \bmod 2^{32} \quad \text{(Formula 7)}$$

has a subtraction. This is problematic because in most arithmetic and logic units the subtraction differs from the addition only by one bit, that is to say a single switch.

In other words, an involution is preferably impossible for the bijective mapping G and the inverse function $G^{-1}$. The bijective mapping G and the inverse function $G^{-1}$ furthermore preferably fulfil the condition that in each case the computation of the bijective mapping G and of the inverse function $G^{-1}$ is different such that trivial bit errors do not deliver an identical result for the two functions. This applies in particular to the addition operation and the subtraction operation.

So that a second communication partner can verify the mapped checksum c', said second communication partner is provided with a piece of information, in a second method step 110, that defines the inverse function $G^{-1}$. This provision can occur at an earlier time, for example, so that this information can be used for many mapped checksums.

In a third method step 115, the second communication partner now has the mapped checksum c' and the message m transmitted to it.

Figure 2:
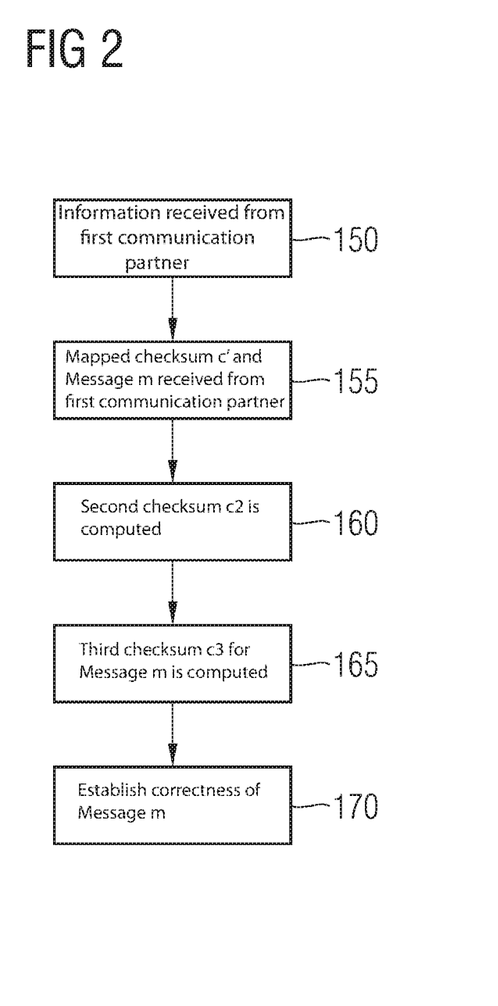
FIG. 2 shows a flowchart for an exemplary embodiment for checking an asymmetric checksum.

FIG. 2 is a flowchart for an exemplary embodiment for checking an asymmetric checksum. The computation rules and the mathematical conditions, which have already been explained in the description for FIG. 1, are also supposed to apply for the explanations below for FIG. 2-5.

In order to check the asymmetric checksum using a second communication partner, a fourth method step 150 involves the information that defines the inverse function $G^{-1}$ for the bijective mapping G being received from the first communication partner.

In a fifth method step 155, the mapped checksum c' and the message m are then received from the first communication partner.

In a sixth method step 160, a second checksum $c_2$ is computed by means of the inverse function $G^{-1}$ using the mapped checksum c' and using a processor, for example. The second checksum $c_2$ corresponds in this case to the first checksum $c_1$, which may have been conditioned by the second function $F_2$. If the second function $F_2$ has conditioned the first checksum $c_1$, then the second communication partner preferably knows the second function $F_2$.

In a seventh method step 165, a third checksum $c_3$ for the message m is then computed. This is preferably done by using the first function $F_1$ so that the same algorithm is used for the checksum computation for the message m in each case. In addition, the second function $F_2$ is applied to the third checksum $c_3$ in a second preprocessing step, analogously to the application of the second function $F_2$ to the first checksum $c_1$. However, the second preprocessing step is carried out only if it is actually necessary, that is to say that the first preprocessing step has been carried out during the generation of the mapped checksum c'. The third checksum can also be referred to as the third conditioned checksum after application of the second function $F_2$.

In an eighth method step 170, the correctness of the message m is established if the second checksum $c_2$ has a sufficient match with the third checksum $c_3$.

The same checksum function is used for the computations or for the first function $F_1$ of the first checksum $c_1$ and the third checksum $c_3$. Similarly, the same algorithm is likewise used for the second function $F_2$ in each case, provided that the first preprocessing step has been performed during the generation of the mapped checksum c'. In this case, the second checksum $c_2$ corresponds to the first checksum $c_1$.

The information about the first function $F_1$ and the second function $F_2$ may be known generally, can be exchanged between the communication partners by means of a separate message, can be configured by an administrator and/or may be included in the information about the inverse function $G^{-1}$.

The basic execution of the method between the first communication partner and the second communication partner is explained below.

The first communication partner's side has the computation rule for forming the bijective mapping G implemented on it. The second communication partner's side has the computation rule for the inverse function $G^{-1}$ implemented on it. The first communication partner computes the first checksum $c_1$ for the message m, conditions the first checksum $c_1$ using the second function $F_2$ and then forms the associated mapped checksum c'. In addition to the first checksum $c_1$ or instead of the first checksum $c_1$, the mapped checksum c' is then transmitted.

The message m and the additional the mapped checksum c' arrive at the second communication partner. The second communication partner now computes the third checksum $c_3$ and then applies the second function $F_2$ to the third checksum $c_3$. Moreover, it computes the second checksum $c_2$, and compares the result with the third checksum $c_3$. If no transmission errors have occurred, the second checksum $c_2$ and the third checksum $c_3$ are identical. If, additionally, the first checksum $c_1$ has been transmitted as well, then the first checksum $c_1$ also matches the second checksum $c_2$, provided that the mapped checksum c' has been transmitted correctly.

If a transmission error has occurred, the second checksum $c_2$ and the third checksum $c_3$ have a high likelihood of not being the same.

Since the second communication partner does not know the bijective mapping G, the second communication partner cannot compute the first checksum $c_1$, and therefore cannot inadvertently use (or even forward) a wrong checksum, without this being noticed later.

Unlike in the case of cryptographic methods, in this case it is irrelevant for the cited purpose of application whether the bijective mapping G can be computed efficiently from the inverse function $G^{-1}$. It is enough that the computation of the bijective mapping G from the inverse function $G^{-1}$ is sufficiently nontrivial, for example needs an algorithm that is not implemented on the second communication partner's side, so that this computation cannot be performed "inadvertently".

In a variant of the exemplary embodiments described, the bijective mapping G and the inverse function $G^{-1}$ are implemented by means of a monoid logic combination.

The first set C' is a monoid in this case, that is to say a half-group with a neutral element 1 and a logic combination "*". If the second function $F_2$ has not been applied to the set of all checksums C, the monoid is the set of all the checksums C.

The first communication partner selects an invertible element a of the monoid, where it holds that $$a * a_{inv} = 1 \qquad \text{(Formula 8)}$$

where $a_{inv}$ is the inverted element for the invertible element a. The first communication partner distributes the inverted element $a_{inv}$ to the second communication partner, and retains the invertible element a.

The bijective mapping is then represented by $$G(c_1) = c_1 * a \qquad \text{(Formula 9)}$$

Further, the inverse function $G^{-1}$ is represented by $$G^{-1}(c') = c' * a_{inv} \qquad \text{(Formula 10)}$$

A possible implementation is explained in detail by means of a monoid below.

In what follows, the monoid is assumed to be represented by the set {0x0, 0x1, 0x2, . . . , 0xffffffff} together with the multiplication modulo 0x100000000. This modular multiplication can be implemented very efficiently, since it is simply possible to use the least significant 32 bits from the result of the normal multiplication.

In this monoid, every uneven number is invertible. If the invertible element is thus assumed to be a=0xc0c17487, for example, then the inverted element is $a_{inv}$=0xa4751137. This can be computed using the Euclidean algorithm, for example. The product of the invertible element a and the inverted element $a_{inv}$ is $$a \cdot a_{inv} = 0x7bd4140700000001 = 1 \bmod 0x100000000 \qquad \text{(Formula 11)}$$

where "·" is the multiplication of whole numbers.

Further, the first function $F_1$ is assumed to be a checksum function, for example the CRC32 function. In this case, it is possible to select the identical mapping as a second function $F_2$, because the image set at CRC32 matches the monoid.

If the first checksum $c_1$=0x82441710 is now assumed to be the CRC32 checksum of a suitable message m to which the second function $F_2$ has additionally been applied, for example, then the mapped checksum c' is defined by $$c' = c * a = 0xef6b6970 \qquad \text{(Formula 12)}$$

This number is transmitted to the second communication partner together with the message m.

The second communication partner now computes the third checksum $c_3$ using the CRC 32 function for the message m and subsequently applies the second function $F_2$ thereto. Additionally, the second checksum $c_2$ is computed:

$$c_2 = c'^* a_{inv} = 0x82441710 \quad \text{(Formula 13)}$$

If the second checksum $c_2$ and the third checksum $c_3$ match, the message m is regarded as correct. The mapped checksum c' could not be computed by the second communication partner itself, however, because it does not know the invertible element a, and the Euclidean algorithm is not implemented.

Besides the above-described multiplication modulo a power of 2 to construct the monoid, a multiplication modulo a prime number p would also be conceivable, for example. The resulting monoid is then a group, if the 0 is excluded. It follows that every element is invertible. The inverse is again computed using the Euclidean algorithm. Since the prime number p is a constant, the modular multiplication can be implemented efficiently, for example through prior computation of 1/p with sufficient accuracy, which simplifies the division to a multiplication.

In a variant of the exemplary embodiments described, the bijective mapping G and the inverse function $G^{-1}$ are implemented by means of matrices and the matrix multiplication.

The first set C' or the set of all checksums C is a vector space and the first communication partner forms an invertible matrix A from the vector space.

$$A = C'^* C' \quad \text{(Formula 14)}$$

The first communication partner computes an inverted matrix $A^{-1}$ for the invertible matrix A and distributes it to the second communication partner.

The bijective mapping is then represented by $$G(c_1) = A^* c_1 \quad \text{(Formula 15)}$$

where "*" is the matrix multiplication.

Further, the inverse function $G^{-1}$ is represented by $$G^{-1}(c') = A^{-1} * c' \quad \text{(Formula 16)}$$

In a further variant of the exemplary embodiments described, the bijective mapping G and the inverse function $G^{-1}$ are implemented by means of tables.

The bijective mapping G or the mapped checksum c' is formed in this case by a first table that stores, for every checksum c, a suitable value for its bijective mapping G or G(c). In this case too, the checksums may have been conditioned by the second function $F_2$ before they are processed further. The first checksum $c_1$ is used as an input value for a conversion table, for example, in order to compute the mapped checksum c'. The inverse function $G^{-1}$ or the second checksum $c_2$ is computed by a second table that contains a suitable checksum for every mapped checksum. In other words, the mapped checksum c' is used as an input value for the second table in order to obtain the second checksum $c_2$.

Figure 3:
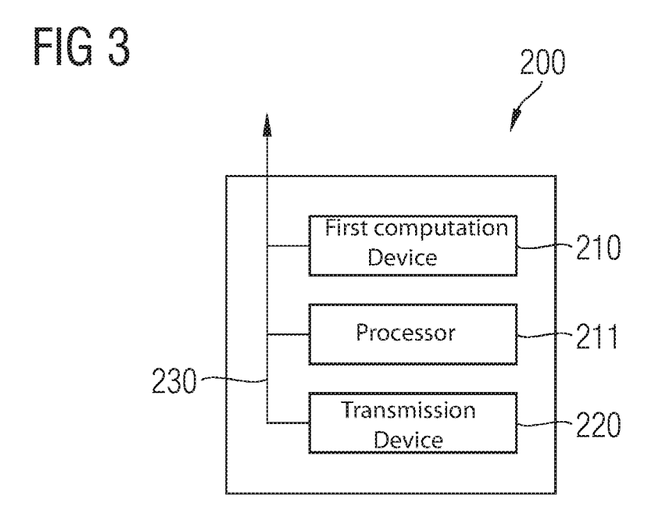
FIG. 3 shows a schematic depiction of an exemplary embodiment of a first communication partner.

FIG. 3 is a schematic depiction of an exemplary embodiment of a first communication partner 200, which is also referred to as a generating device or transmitter. The generating device has a first computation device 210 and a transmission device 220, which are communicatively connected to one another via a bus 230.

The first computation device 210 uses a processor 211 to compute a mapped checksum by means of a bijective mapping from a first checksum, wherein the first checksum is assigned from the set of all possible checksums to a respective message from a set of all possible messages by means of a first function, the first checksum being conditioned in particular by virtue of a second function mapping the set of all possible checksums onto a first set.

The transmission device 220 distributes a piece of information that defines an inverse function for the bijective mapping to at least one second communication partner, which is also referred to as a verifier or verifier device, wherein the inverse function is used to compute the first checksum from the mapped checksum. The transmission device 220 additionally transmits the mapped checksum and the message to the at least one second communication partner.

Figure 4:
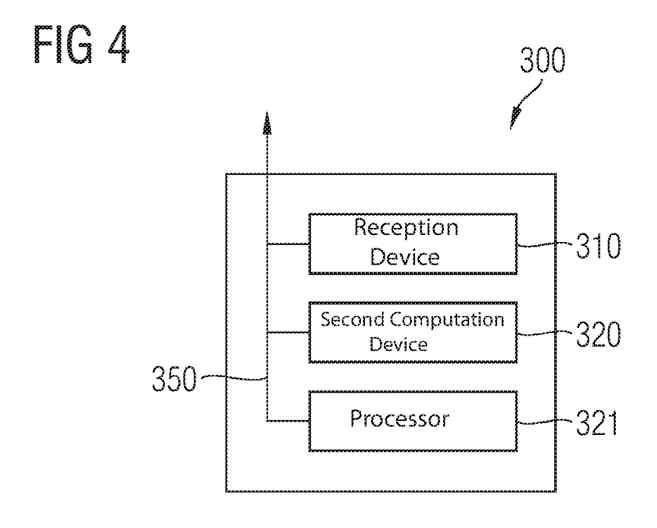
FIG. 4 shows a schematic depiction of an exemplary embodiment of a second communication partner.

FIG. 4 is a schematic depiction of an exemplary embodiment of a second communication partner 300, which is also referred to as a transmitter, verifier or verifier device. The verifier device has a reception device 310 and a second computation device 320, which are communicatively connected to one another via a bus 350.

The reception device 310 receives a piece of information that defines an inverse function for a bijective mapping from a first communication partner, which is also referred to as a generating device. Additionally, the reception device 310 receives a mapped checksum and a message from the first communication partner.

The second computation device 320 uses a processor 321 to compute a second checksum by means of the inverse function using the mapped checksum.

The second computation device 320 additionally preferably uses the processor 321 to compute a third checksum for the message, wherein the third checksum is assigned from the set of all possible checksums to a respective message from a set of all possible messages by means of a first function, the third checksum being conditioned in particular by virtue of a second function mapping the set of all possible checksums onto a first set.

Furthermore, the second computation device 320 establishes a correctness of the message if the second checksum has a sufficient match with the third checksum.

Figure 5:
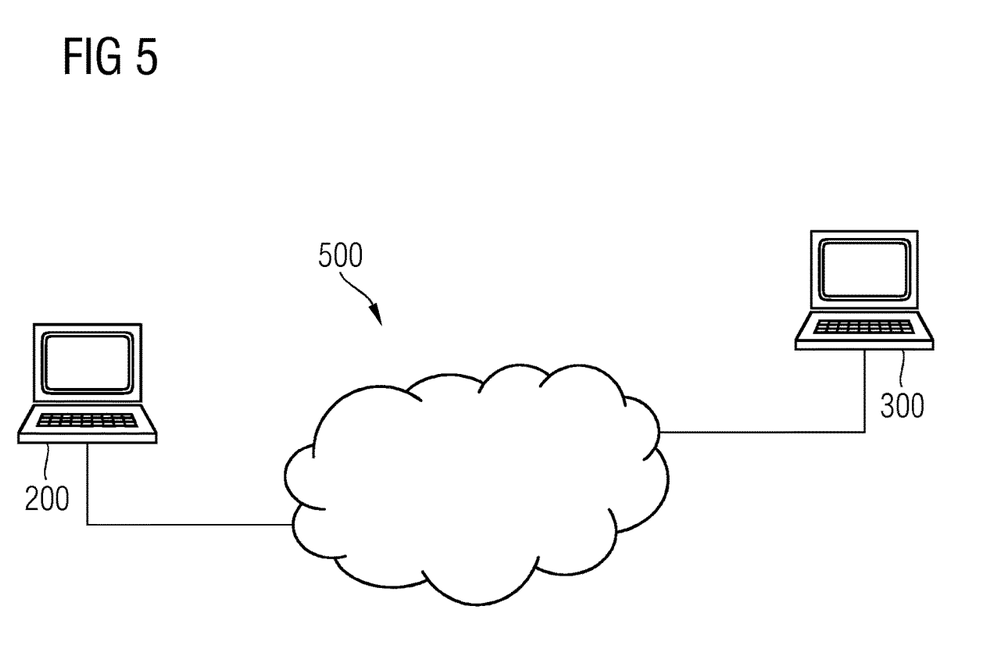
FIG. 5 shows a schematic depiction of an exemplary embodiment of a computer system having a first communication partner and a second communication partner.

FIG. 5 is a schematic depiction of an exemplary embodiment of a computer system 500.

The computer system 500 comprises a first communication partner 200 in accordance with the description for FIG. 3, for example in the form of a first computer, for example an IBM-compatible personal computer with a Linux operating system. The first communication partner 200 is connected via a network, for example an Ethernet network or a token ring network, to a second communication partner 300 in accordance with the description of FIG. 4 in the form of a second computer, for example an Apple iMac®.

The first communication partner 200 and the second communication partner 300 each comprise commercially available hardware components, for example, such as a display device preferably in the form of a TFT monitor, in particular at least one input device preferably in the form of a computer mouse and/or a keyboard, at least one data storage medium preferably in the form of a solid-state hard disk and/or a DVD read and/or write drive, a processor, preferably an Intel x86-compatible processor, a network interface, preferably an Ethernet interface, main memory, preferably DDR SDRAM (Double Data Rate Synchronous Dynamic Random Access Memory), and/or further hardware or peripheral devices known to a person skilled in the art.

The hardware components of the first communication partner 200 are communicatively connected to one another via a motherboard and a data bus, for example. The hardware components of the second communication partner 300 are likewise communicatively connected to one another via a motherboard and a data bus, for example. The respective motherboards of the first communication partner 200 and the second communication partner 300 preferably have at least one slot or other interfaces, for example a Universal Serial Bus (USB) or a FireWire interface, for connecting a peripheral device to the processor via the data bus. The slot is preferably in the form of a Peripheral Component Interconnect Express Bus (PCIe).

The method that has been explained in the description of FIG. 2 and FIG. 3 is implemented by an apparatus or multiple apparatuses that are in the form of a plug-in card or USB device, for example. This plug-in card is inserted into the slot, for example, and therefore has a communicative connection to the hardware components and/or further peripherals.

In one variant, the method is implemented by program code that is executed via the processor.

In a further variant, the first communication partner 200 executes at least one virtualized computer, for example, that has a virtualized plug-in card that implements the method, or implements the method by means of program code that is executed by the virtualized processor.

In a further variant, the method is implemented by a terminal server by means of a plug-in card or program code, for example, the terminal server likewise being able to be a virtualized terminal server. The terminal server then serves a terminal client, so that a user or another program can carry out the method.

In a further variant, the first communication partner is a first process or a first program and the second communication partner is a second process or a second program that is executed on a computer.

In a further variant, an integrated circuit, for example an FPGA or an ASIC, is transferred to a state, can be put into a state, by means of program commands in order to carry out the method according to the invention.

Although the invention has been illustrated and described in more detail by the exemplary embodiments, the invention is not limited by the disclosed examples and other variations can be derived therefrom by a person skilled in the art without departing from the scope of protection of the invention.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The claims are as follows:

1. A method for a first communication partner to create an asymmetric checksum on a computer-aided basis, the method comprising:
   computing, by a processor of a computing system, a mapped checksum by means of a bijective mapping of a first checksum, wherein the first checksum is assigned from a set of all possible checksums to a respective message from a set of all possible messages by means of a first function, the first checksum is conditioned by virtue of a second function mapping the set of all possible checksums onto a first set of checksums;
   distributing, by the processor, a piece of information that defines an inverse function for the bijective mapping of the first checksum to at least one second communication partner, wherein the inverse function is used to compute the first checksum from the mapped checksum; and
   transmitting, by the processor, the mapped checksum and the respective message to the at least one second communication partner.

2. The method as claimed in claim 1, wherein in addition to the respective message and the mapped checksum, the first checksum is sent to the at least one second communication partner.

3. The method as claimed in claim 1, wherein the computing of the mapped checksum is known only to the first communication partner.

4. The method as claimed in claim 1, wherein the conditioning of the first checksum using the second function mapping is performed in a first preprocessing step before the computing of the mapped checksum, and the bijective mapping is a mapping of the first set of checksums onto itself.

5. The method as claimed in claim 1, wherein the second function mapping maps a 64-bit checksum onto a 32-bit checksum or is an identity element.

6. The method as claimed in claim 1, wherein the first set or the set of all possible checksums is a monoid,
   the monoid comprises an identity element as neutral element and an operation of a logic combination is defined for the monoid, the first communication partner selects an invertible element of the monoid;
   the first communication partner computes an inverted element for the invertible element; the mapped checksum is formed by means of the bijective mapping in the form of the logic combination of the first checksum with the invertible element, the information comprises the inverted element; and the logic combination of in particular the invertible element and the mapped checksum results in the identity element.

7. The method as claimed in claim 6, wherein the second checksum is computed by means of the inverse function in the form of the logic combination of the inverted element with the mapped checksum.

8. The method as claimed in claim 1, wherein
   the first set or the set of all possible checksums is a vector space; the first communication partner forms an invertible matrix from the vector space; the first communication partner forms an inverted matrix from the invertible matrix; the information comprises the inverted matrix; and the mapped checksum is formed by means of the bijective mapping in the form of the matrix multiplication of the first checksum by the matrix.

9. The method as claimed in claim 8, wherein the second checksum is computed by means of the inverse function in the form of the matrix multiplication by virtue of the inverted matrix being multiplied by the mapped checksum.

10. The method as claimed in claim 1, wherein
    the first communication partner forms a first table in which a mapped checksum is assigned to each of all possible checksums; the first communication partner forms a second table in which a checksum is assigned to a respective mapped checksum; the first table is the bijective mapping and the second table is the inverse function of the bijective mapping; and the information about an inverse function comprises the second table.

11. The method as claimed in claim 10, wherein the second checksum is computed by means of the inverse function in the form of the second table.

12. The method as claimed in claim 10, wherein the mapped checksum is implemented as a numeral or as an alphanumeric value.

13. An integrated circuit that is equipped with configuration steps for performing the method as claimed in claim 1.

14. A computer program product comprising a computer readable hardware storage device having computer readable program code stored therein, said program code executable by a processor of a computer system to implement a method as claimed in claim 1.

15. A provision apparatus for the computer program product, as claimed in claim 14, wherein the provision apparatus stores and/or provides the computer program product.

16. A first communication partner for generating an asymmetric checksum, comprising:

a first computation device that uses a processor to compute a mapped checksum by means of a bijective mapping of a first checksum, wherein the first checksum is assigned from a set of all possible checksums to a respective message from a set of all possible messages by means of a first function, the first checksum is conditioned by virtue of a second function mapping the set of all possible checksums onto a first set of checksums; and a transmission device that distributes a piece of information that defines an inverse function for the bijective mapping of the first checksum to at least one second communication partner, wherein the inverse function is used to compute the first checksum from the mapped checksum, and transmits the mapped checksum and the respective message to the at least one second communication partner.

17. The first communication partner as claimed in claim 16, wherein the first communication partner is a virtualized first communication device.

18. A computer system comprising:

the first communication device as claimed in claim 16, and a second communication device.

* * * * *